M. W. BEYER.
CAMERA ATTACHMENT.
APPLICATION FILED JUNE 15, 1917. RENEWED JAN. 8, 1919.
1,312,674.
Patented Aug. 12, 1919.
3 SHEETS—SHEET 2.
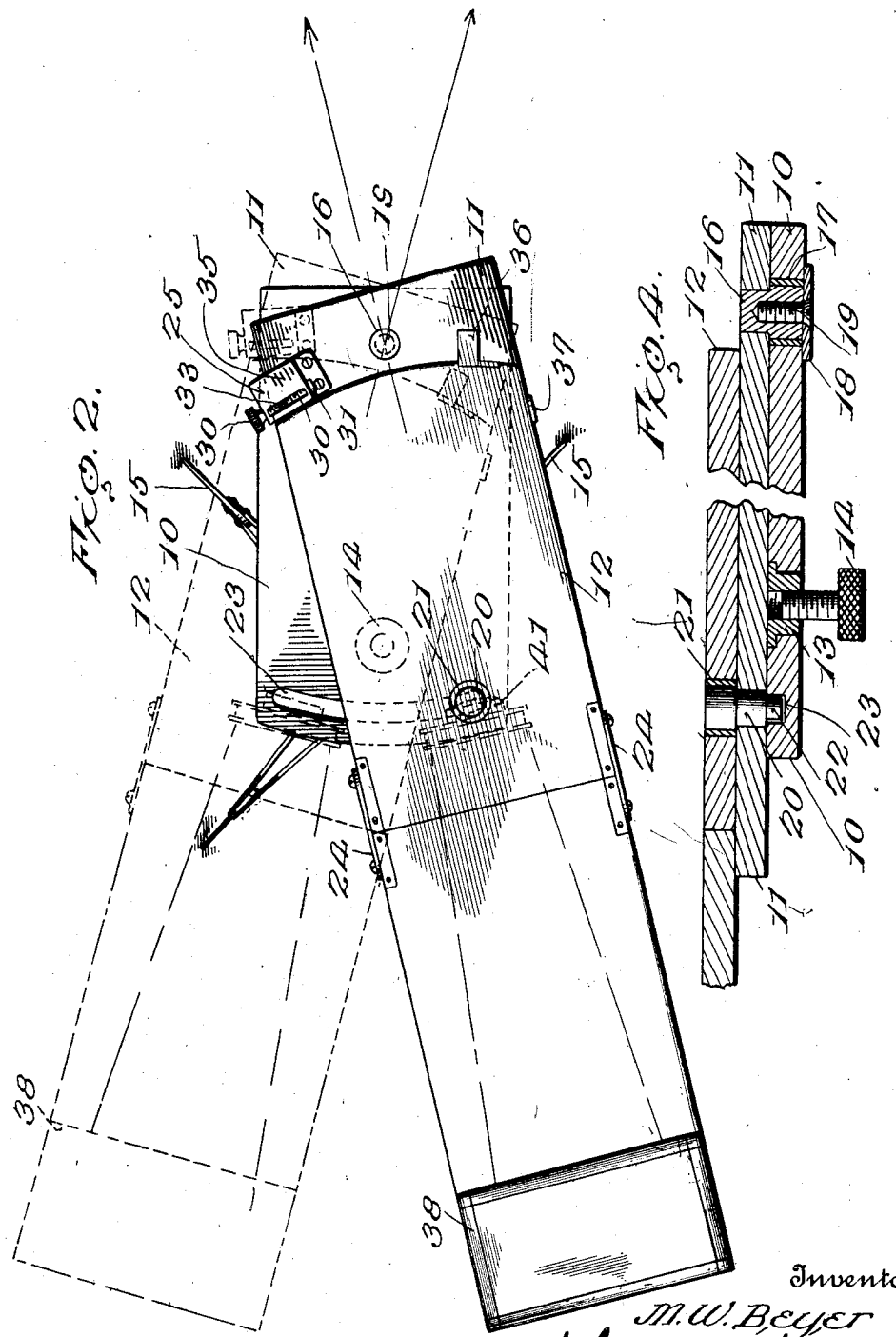

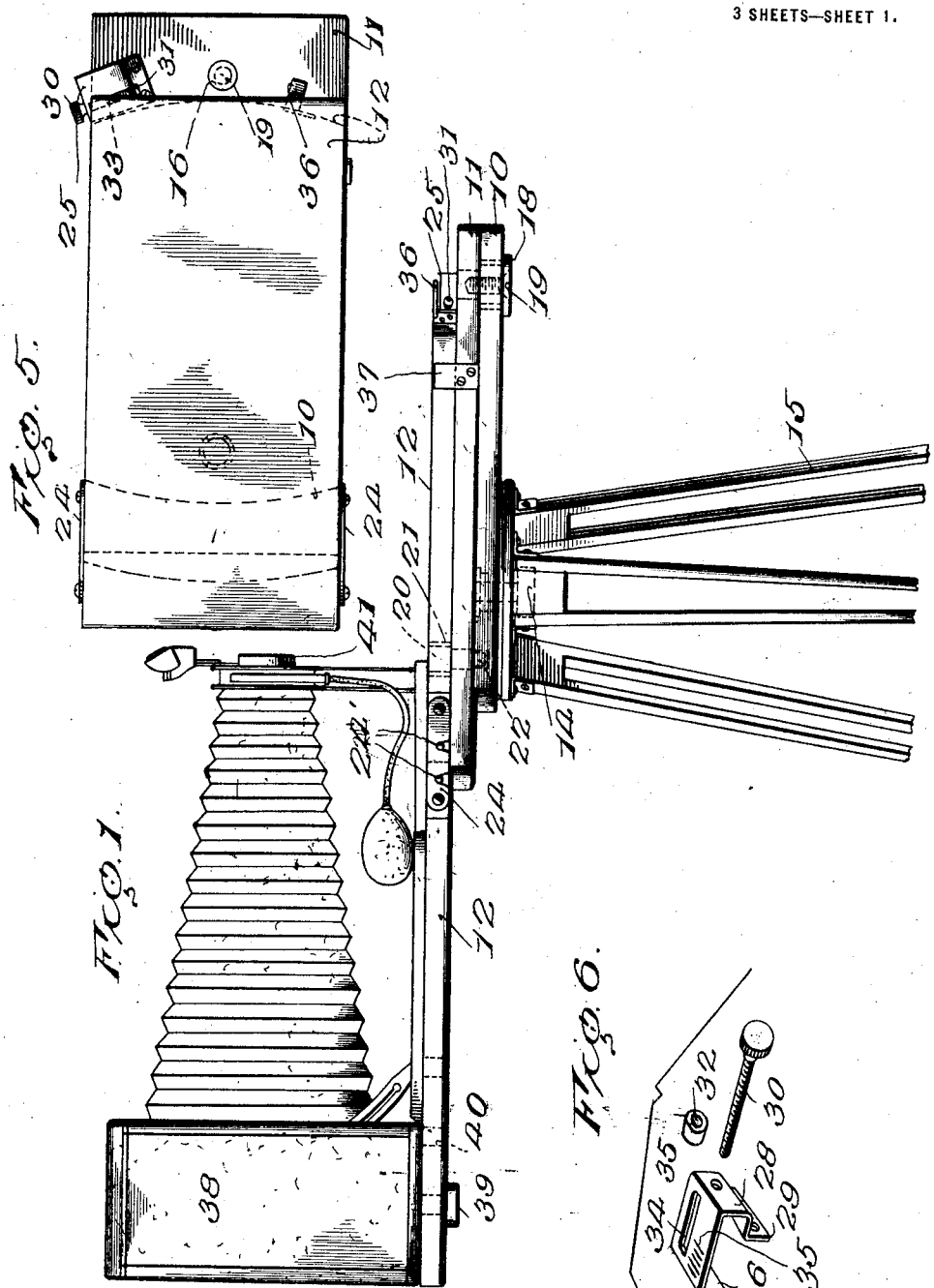

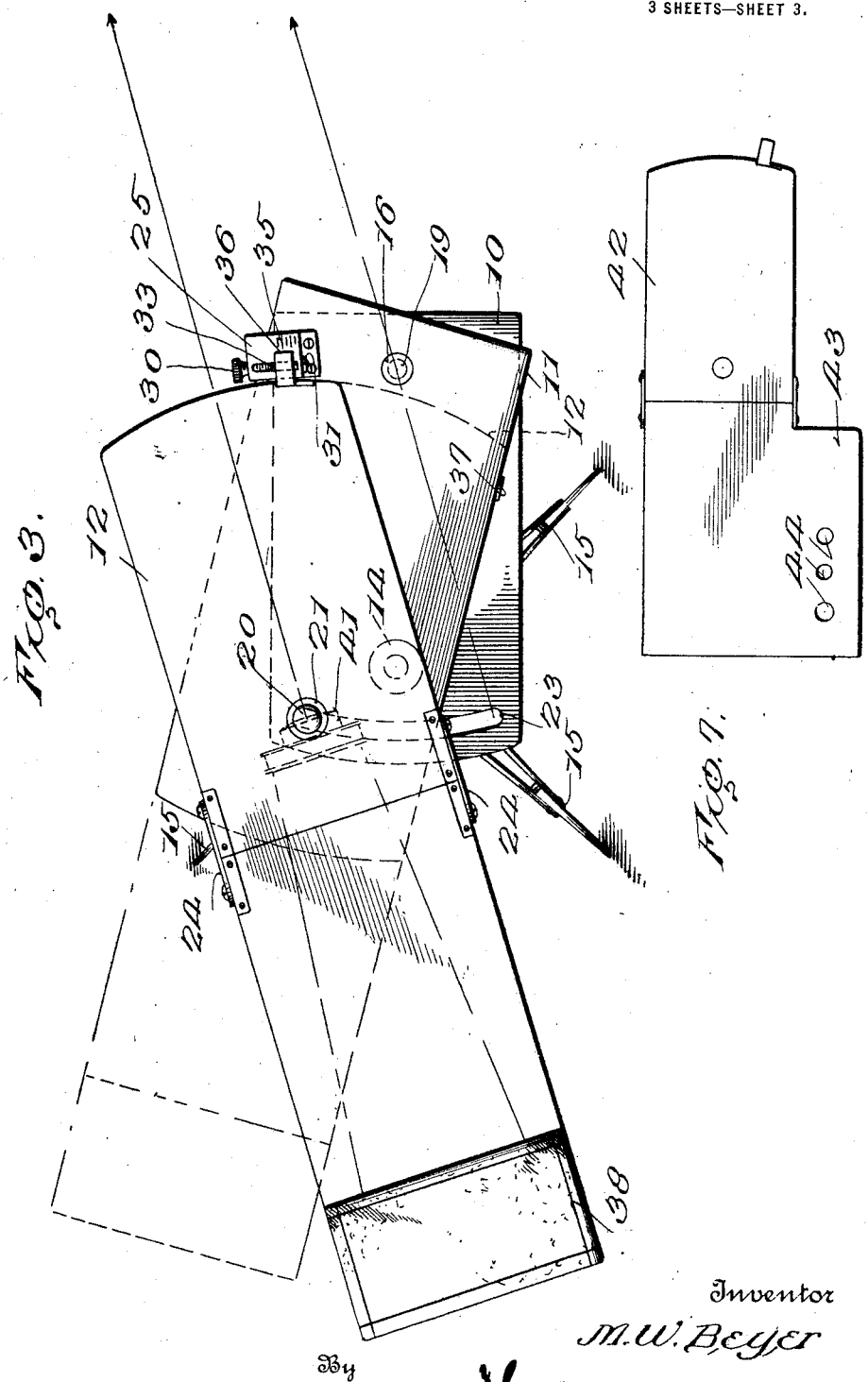

UNITED STATES PATENT OFFICE.

MAX WM. BEYER, OF EDGEWATER, NEW JERSEY.

CAMERA ATTACHMENT.

1,312,674. Specification of Letters Patent. Patented Aug. 12, 1919.

Application filed June 15, 1917, Serial No. 174,964. Renewed January 8, 1919. Serial No. 270,210.

*To all whom it may concern:*

Be it known that I, MAX W. BEYER, a citizen of the United States, residing at Edgewater, in the county of Bergen and State of New Jersey, have invented certain new and useful Improvements in Camera Attachments, of which the following is a specification.

This invention relates to an improved camera attachment and has as its primary object to provide a device which may be adjusted for focusing or training an ordinary single lens camera upon a subject from converging angles for taking a stereoscopic picture as would be seen by the human eyes and wherein the device may also be adjusted for taking pictures with the single lens camera in a manner similar to the usual twin lens stereoscopic camera so that the picture taken will be of exaggerated depth.

The invention has as a further object to provide a device of the above described character which may be adjusted for selectively focusing or training the single lens camera upon a subject from points spaced apart upon the arc of a circle a distance apart corresponding to the distance between the human eyes so that the combined views of two exposures taken from the said points respectively will present a picture having the same depth as would be seen by the eyes.

A further object of the invention is to provide a device having an adjustable stop for accurately varying the angular focus of the camera for different distances.

And the invention has as a still further object to provide a device which will be simple and accordingly easy to operate and which may also be used in connection with substantially any conventional type of single lens camera.

Other and incidental objects will appear as the description proceeds and in the drawings wherein I have illustrated the preferred embodiment of the invention and wherein similar reference characters designate corresponding parts throughout the several views:

Figure 1 is a side elevation showing the manner in which my improved device is used with the conventional type of tripod and camera, Fig. 2 is a plan view showing the first position of adjustment of the device for taking the initial exposure, the intermediate position of adjustment of the said device being shown in dotted lines, Fig. 3 is a view similar to Fig. 2 and showing the second position of adjustment of the device for taking the second exposure, the intermediate position of adjustment also being shown in dotted lines in this figure, Fig. 4 is a fragmentary sectional view more particularly showing the manner in which the relatively movable plates of the device are pivotally connected, Fig. 5 is a fragmentary plan view showing the stop and indicator employed for positioning the top plate of the device, Fig. 6 is a perspective view showing the indicator with the parts thereof disconnected from each other, and Fig. 7 is a plan view illustrating a slight modification of the invention.

In carrying out the invention I employ a base plate 10, a second or intermediate plate 11 and a top or camera supporting plate 12. The plates 10, 11 and 12 may be formed of wood or other approved material and while in the present instance I have shown these elements as partaking of the nature of plates still, it will be seen as the description proceeds that relatively movable bars or other pivotally connected members could be substituted therefor and the term plate as herein used will accordingly be held to include such variations. Countersunk in the inner extremity of the plate 10 at a point substantially midway between the side edges thereof is an internally screw threaded socket 13 receiving a tripod screw 14 for connecting the device to a tripod, as conventionally illustrated at 15. In this connection it should be noted that the plate 10 will be held fixed upon the tripod. Fixed in the forward extremity of the plate 11 at a point substantially midway between the side edges thereof is a downwardly projecting pivot pin 16 which extends freely through a bearing sleeve or ring 17 countersunk in the plate 10 and terminates flush with the lower side of this latter plate. Overlying the lower end of the pivot pin to extend over the adjacent terminal of the sleeve 17 is a flat washer or disk 18 through which extends a screw 19 threaded into the pivot pin 16 axially thereof with the head of the screw countersunk in the said washer. The screw 19 therefore serves to detachably connect the plates 10 and 11 at the said pivot pin.

Fixed in the inner extremity of the plate 11 medially thereof is a pivot pin 20 the upper extremity of which is slightly enlarged and projects freely through a bearing sleeve or ring 21 countersunk in the plate 12, the said bearing ring being arranged substantially midway between the side edges of this latter plate. At its lower extremity the pivot pin 20 is reduced to provide a stop 22 projecting freely into an arcuate groove 23 formed in the inner extremity of the plate 10 concentric to the pivot pin 16. It will thus be seen that the plate 11 may swing upon the plate 10 about the axis of the pivot pin 16 to be limited in its movement in opposite directions by the stop 22 engaging within the ends of the groove 23. At the same time, the plate 12 may swing upon the plate 11 about the axis of the pivot pin 20. The plate 12 is somewhat longer than the plates 10 and 11 and is preferably formed of coacting sections connected by hinge bars 24 pivotally connected at their extremities with channeled binding clips mounted upon the side edges of the said plate sections at their meeting ends. These binding clips are provided with spaced stop pins 24' arranged for engagement in suitable notches in the lower edges of the said bars for supporting the sections of the plate in alinement. As particularly shown in Fig. 4 of the drawings, the plate 11 is arranged to overhang the inner extremity of the plate 10 to engage beneath the hinge bars and will thus coact with the said bars for rigidly supporting the rearmost section of the plate 12 when swung outwardly to active position. This rearmost plate section may, as illustrated in Fig. 5 of the drawings, be moved to overlie the forward section of the plate so that the device may thus be stored in a minimum space for packing or transportation.

At its forward extremity the plate 12 terminates, as particularly shown in Figs. 2 and 3, short of the forward ends of the plates 10 and 11 and is provided with an adjacent arcuate edge concentric to the pivot pin 20. Touching the arc of this edge of the said plate is a tangentially arranged indicator 25 mounted upon the plate 11 at one side edge thereof. This indicator is illustrated in detail in Fig. 6 of the drawings and includes a preferably metallic body formed from a strip of suitable sheet metal bent at one extremity to provide an end wall 26 from which projects a lateral flange 27. At its opposite extremity the said strip is bent to form an end wall 28 confronting the wall 26 and extending from this wall 28 is an offset flange 29. Loosely fitted through the end walls 26 and 28 is a transverse adjusting screw 30 connected with the body of the indicator by a collar 31 and threaded upon the said adjusting screw is a nut or sleeve 32 provided with an upstanding lug or stop 33 projecting freely through a suitable slot 34 extending longitudinally of the indicator body. As will now be noted, the flange 29 of the body of the indicator is arranged to seat within a suitable notch in the adjacent edge of the plate 11 with the indicator body extending above and inwardly over the plate to be supported at its opposite extremity by the flange 27 seating upon the upper face of the plate. These flanges 27 and 29 are secured to the plate by screws or other suitable fastening devices for firmly holding the indicator in position with the head of the set screw 30 directed outwardly so that the said set screw may be easily manipulated for adjusting the stop 33. Formed on the upper face of the indicator body is a suitable scale 35 having graduations identified by numbers indicating linear feet. Mounted upon the forward arcuate edge of the plate 12 is a radially extending stop 36 secured by screws or other suitable fastening devices to the said edge of the plate and projecting forwardly therefrom with the stop 36 adapted to coöperate with the indicator stop 33. Connected to the edge of the plate 11 opposite the indicator 25 is, as clearly shown in Fig. 1 of the drawings, an upstanding stop 37. The purpose of this stop will presently appear. It is now to be observed that the plates 10, 11 and 12 are preferably of equal width and thickness.

As previously intimated, the plate 12 is designed to carry any ordinary single lens camera in the manner illustrated in the drawings and for convenience, such a camera has been conventionally illustrated at 38. This camera is provided with the usual tripod screw sockets and engaging in one of the said sockets to extend through the rear extremity of the plate 12 is a tripod screw 39 connecting the camera with the said plate. In order to accommodate cameras of different lengths, the rear extremity of the plate 12 is provided with a series of longitudinally spaced openings 40 for receiving the screw 39 or if preferred a medially arranged slot may be formed to extend longitudinally of the said plate in lieu of the said openings.

Particular attention is now directed to the fact that the lens 41 of the camera is arranged immediately over the pivot pin 20 of the plate 12 and accordingly also directly over the stop 22. Consequently, the lens of the camera will swing with the plate 12 about the axis of the pivot pin 16 of the plate 11, so that the arc of the lens will be equal to the arc of the said stop and defined by the groove 23. For taking stereoscopic pictures the plates 11 and 12 are first swung upon the plate 10 about the pivot pin 16 to the position illustrated in Fig. 2 of the drawings with the stop 22 of the pivot pin 20 engaging in the adjacent end of the groove 23 and with the forward extremity of the plate 12 engaging with the stop 37 upon the plate 11 for holding the said plates in alinement. The purpose of the stop 37 therefore now becomes apparent. In this position of the plates 11 and 12 the camera is focused on the subject and for convenience it will be assumed the subject is fifty feet distant from the camera. When the camera has thus been focused, the first exposure is taken. After taking the first exposure, the plates 11 and 12 are then swung about the pivot pin 16 to what will be termed the intermediate position of the said plates. In this intermediate position of the plates, the said plates are, as shown in dotted lines in Figs. 2 and 3 of the drawings, still arranged in alinement with the stop 22 of the pivot pin 20 engaging in the opposite extremity of the groove 23. The intermediate position of the plates being attained, the plate 12 is then swung upon the pivot pin 20 to rotate the lens of the camera about the axis of the said pin until the stop 36 strikes the indicator stop 33 when the plates will, as shown in full lines in Fig. 3 of the drawings, be adjusted in second position. By manipulating the set screw 30 of the indicator 25 the indicator stop 33 is, in the instance taken, adjusted to a position opposite the graduation of the scale 35 reading fifty feet. The lens of the camera will accordingly thus be focused or trained upon the subject, when the second exposure is taken. It will, of course, be understood that the two exposures taken from the first and second positions of the camera are imposed upon separate negatives.

The groove 23 is of a length corresponding to the distance between the human eyes. Accordingly, when the device is adjusted to arrange the camera in first position, as above described, the camera will be trained to view the subject at an angle. Then, when the device is adjusted to arrange the camera in intermediate position, it will be seen that the lens of the camera will have been swung in an arc of a circle having the pivot 16 as its center, a distance corresponding to the distance between the eyes. Consequently when the plate 12 is rotated upon the pivot pin 20 to correct the training of the camera to again view the subject, the camera will be focused or trained to so view the subject at an angle converging toward the angle of the first view. The two exposures of the camera when combined will thus present a picture of a depth as would be seen by the human eyes. Accordingly, I provide a construction which is far superior to the ordinary twin lens stereoscopic camera wherein the lenses are not focused on the subject taken and accordingly produce a picture of exaggerated depth. Furthermore, the construction of the present invention is such that substantially any conventional type of single lens camera may be employed in connection therewith and as will be readily understood in view of the preceding description, the camera may be readily focused for taking subjects at different distances by simply manipulating the stop of the indicator 25. Also, it will be seen in view of the preceding description that my improved device may be adjusted for taking pictures of exaggerated depth as in the case of the usual twin lens stereoscopic camera. This result may be found desirable in some instances and in view of the above explanation as to the operation of the device, the manner of positioning the camera to obtain such result should be readily understood.

In Fig. 7 of the drawings I have illustrated a slight modification of the invention which relates more particularly to the construction of the top plate of the device. In this modification, the top plate is shown detached and is illustrated at 42. The rear section of this plate is formed with a lateral extension 43 in which is provided a series of openings 44 each adapted to receive a tripod screw for connecting a camera to the said plate. This provides a construction whereby a camera having a tripod screw opening therein adjacent one corner of the camera or adjacent one side edge thereof, may be readily connected to the plate. Otherwise, the modified construction is identical with the preferred form of the invention and a further description of the modification will therefore not be given.

Having thus described the invention, what is claimed as new is:

1. A device of the character described including a base plate, an intermediate plate swingingly connected thereto, and a plate swingingly connected to the intermediate plate at a point upon the arc thereof, the said last mentioned plate being adapted to receive a camera with the lens thereof arranged over the axis of the said plate.

2. A device of the character described including a base plate, an intermediate plate swingingly connected thereto, a camera receiving plate swingingly connected to the intermediate plate and an indicator having a stop adjustable for limiting the said camera receiving plate in its swinging movement in one direction upon the said second plate.

3. A device of the character described including a base plate, an intermediate plate swingingly connected thereto, a camera receiving plate mounted upon the intermediate plate, means swingingly connecting the said camera receiving plate with the intermediate plate and means upon the base plate to coact with said first mentioned means for limiting the intermediate plate in its swinging movement in opposite directions upon the base plate.

4. A device of the character described including a base plate, an intermediate plate swingingly connected thereto, a camera receiving plate mounted upon the intermediate plate, and means swingingly connecting the camera receiving plate with the intermediate plate, the said means providing a stop coacting with the base plate for limiting the intermediate plate in its swinging movement in opposite directions upon the base plate.

5. A device of the character described including a base plate, an intermediate plate swingingly connected thereto, a camera receiving plate, mounted upon the intermediate plate, and a pivot pin swingingly connecting the camera receiving plate with the intermediate plate, the said pivot pin providing a stop coacting with the base plate for limiting the intermediate plate in its swinging movement in opposite directions upon the base plate.

6. A device of the character described including a base plate, an intermediate plate swingingly connected thereto, the base plate being provided with an arcuate groove concentric to the axis of the intermediate plate, a camera receiving plate mounted upon the intermediate plate, and means pivotally connecting the camera receiving plate with the said intermediate plate and engaging in said groove for limiting the intermediate plate in its swinging movement in opposite directions upon the base plate.

7. A device of the character described including a base plate, an intermediate plate swingingly connected thereto, a camera receiving plate pivotally connected to the intermediate plate, means for limiting the intermediate plate in its swinging movement in opposite directions upon the base plate, means for limiting the camera receiving plate in its swinging movement in one direction upon the intermediate plate with the said camera receiving plate and intermediate plate arranged in alinement, and means for adjustably limiting the camera receiving plate in its swinging movement in the opposite direction upon the intermediate plate.

8. A device of the character described including a plurality of pivotally connected plates, one being adapted to carry a camera, said plates being adjustable with respect to each other to swing the camera whereby the lens thereof will describe an arc and being further adjustable for pointing the lens upon a subject from points spaced apart upon the said arc a distance corresponding to the distance between the human eyes.

9. The combination with a camera, of an attachment therefor including a plurality of coacting plates adjustable for shifting the camera horizontally with one of said plates in the arc of a circle described by the lens of the camera and selectively pointing the said camera upon a common point from spaced points upon the said arc.

10. A device of the character described including a plurality of coacting plates adjustable with respect to each other for shifting a camera carried by one of said plates from an initial point trained on a subject to a second point spaced laterally from the first point and correcting the training of the camera with respect to the subject.

11. A device of the character described including a plurality of coacting plates adjustable with respect to each other for shifting a camera from an initial point trained on a subject to a second point spaced laterally from the first point, and means for correcting the training of the camera with respect to the subject when disposed at the said second mentioned point.

12. A device of the character described including a plurality of coacting plates adjustable with respect to each other for shifting a camera from an initial point trained on a subject to a second point spaced laterally from the first point, means for correcting the training of the camera with respect to the subject when disposed at the said second mentioned point, and means for indicating positions of corrected adjustment of the camera.

13. A device of the character described including a plurality of coacting plates adjustable with respect to each other for shifting a camera carried by one of said plates from an initial point trained on a subject to a second point spaced laterally from the first point, means for correcting the training of the camera with respect to the subject when disposed at the said second mentioned point, and stop means for limiting the camera at corrected adjustment.

14. A device of the character described including a base plate, an intermediate plate connected to the base plate to swing horizontally thereon, and a plate swingingly connected to the intermediate plate and adapted to receive a camera for swinging adjustment horizontally therewith.

15. A device of the character described including a plurality of plates pivotally connected for horizontal movement with respect to each other and one being adapted to carry a camera, the said plates being adjustable for swinging the camera whereby the lens thereof will describe an arc and being further adjustable for selectively pointing the camera lens toward a subject from angles converging in a horizontal plane toward the subject.

16. A device of the character described including a plurality of coacting plates, one being adapted to carry a camera, and means connecting said plates for adjustment with respect to each other for shifting the camera whereby the lens thereof will describe a path of movement and being further adjustable for selectively pointing the camera lens toward a subject from spaced points in the said path.

In testimony whereof I affix my signature.

MAX WM. BEYER. [L. S.]

Copies of this patent may be obtained for five cents each, by addressing the "Commissioner of Patents, Washington, D. C."